United States Patent [19]

Henke et al.

[11] 4,246,880
[45] Jan. 27, 1981

[54] ARRANGEMENT FOR HEATING THE INTAKE PIPE OF A SPARK-IGNITED INTERNAL COMBUSTION ENGINE

[75] Inventors: Ulrich Henke, Alsdorf; Wojciech Marusiak, Dusseldorf; Hermann Baumler, Burscheid, all of Fed. Rep. of Germany

[73] Assignee: Pierburg GmbH & Co. KG, Neuss, Fed. Rep. of Germany

[21] Appl. No.: 68,963

[22] Filed: Aug. 21, 1979

[30] Foreign Application Priority Data

Aug. 23, 1978 [DE] Fed. Rep. of Germany ... 7825072[U]

[51] Int. Cl.³ .............................................. F02M 31/00
[52] U.S. Cl. ................................... 123/549; 123/548; 261/142
[58] Field of Search ................ 261/142; 123/548, 549, 123/552

[56] References Cited

U.S. PATENT DOCUMENTS

| | | | |
|---|---|---|---|
| 3,886,918 | 6/1975 | Cole | 123/548 |
| 3,898,422 | 8/1975 | Fuller | 123/549 |
| 3,911,882 | 10/1975 | Thornburgh | 123/548 |
| 3,987,772 | 10/1976 | McBride | 123/549 |
| 4,141,327 | 2/1979 | Marcoux | 123/549 |

*Primary Examiner*—Ronald H. Lazarus
*Attorney, Agent, or Firm*—Haseltine and Lake

[57] ABSTRACT

An arrangement for heating the intake pipe of a spark-ignited internal combustion engine with electrical heating elements having a positive temperature coefficient. These heating elements are located on a heating plate which forms part of the intake pipe wall, and are held by a carrier member, rigidly fastened to these elements. This carrier member has several elastic plates, one for each heating element, connected to one central current contact surface. The carrier member is centered in the heating plate and is loaded by a compression spring which is centered in the cover of the housing of the arrangement.

1 Claim, 2 Drawing Figures

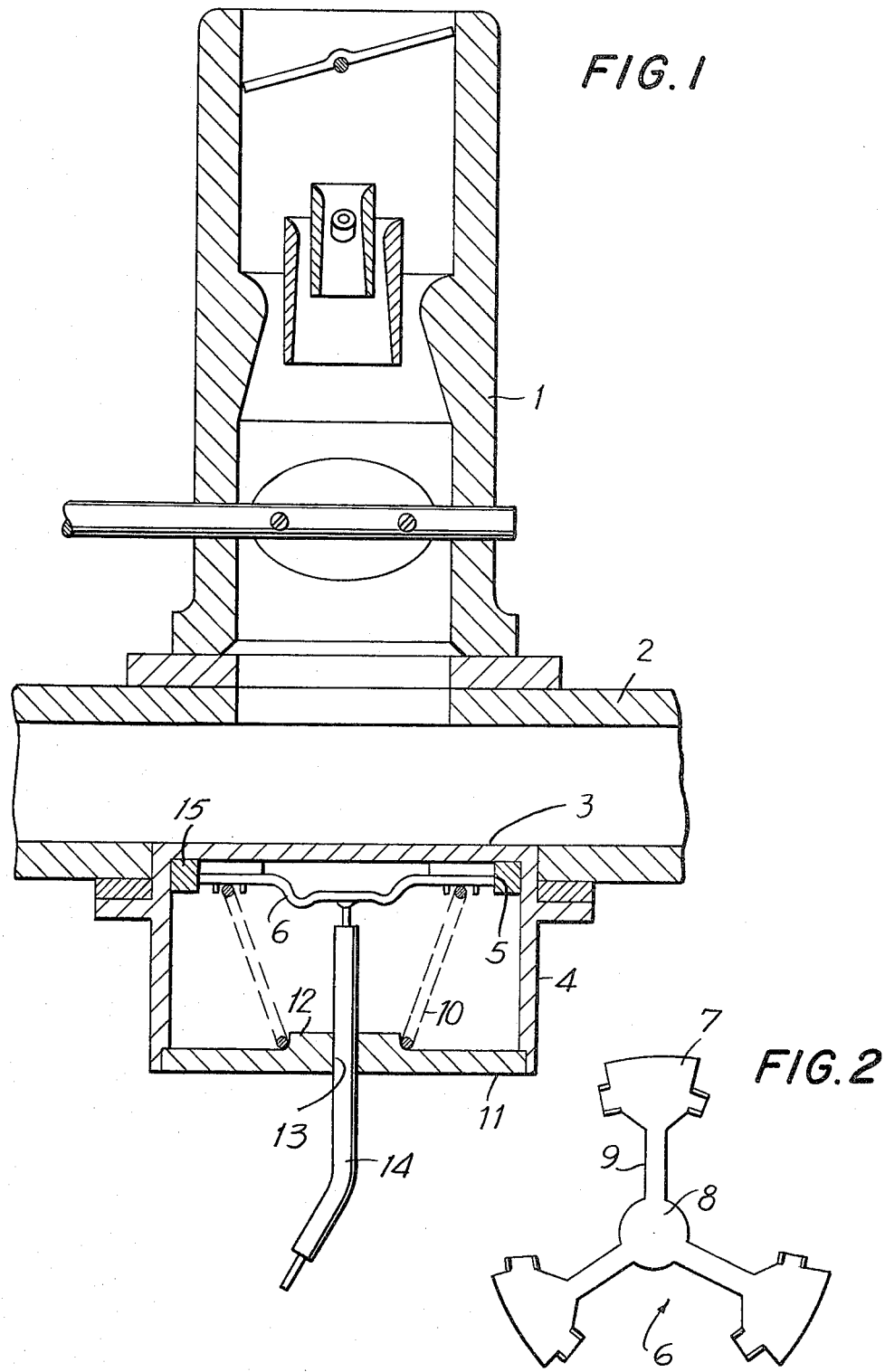

ARRANGEMENT FOR HEATING THE INTAKE PIPE OF A SPARK-IGNITED INTERNAL COMBUSTION ENGINE

BACKGROUND OF THE INVENTION

The present invention relates to an arrangement for heating an intake pipe of a spark-ignited internal combustion engine, in which electrical heater elements (PTC-elements) with positive temperature coefficients are located in a housing.

The purpose of such an arrangement is to evaporate the fuel precipitated on the wall of the intake pipe by intensive heating, in order to achieve good mixture processing while the engine is still cold.

Upon reaching the operating temperature of the engine, the abnormal temperature of the PTC elements is reached, causing the resistance of the PTC elements to rise so rapidly that the heating device virtually requires no energy from the battery.

With a known arrangement, the heating current is delivered to the PTC elements via press-on or contact springs. This type of contact during use leads to difficulties due to vibrations since the components are not fixed relative to each other and in relation to the heating surface.

It is an object of the present invention to provide an arrangement where elements are safely supplied with current and are secured against shifting due to vibration.

Another object of the present invention is to provide an arrangement of the foregoing character which is substantially simple in construction and may be economically fabricated.

A further object of the present invention is to provide an arrangement for heating the intake pipe, as described, which may be readily maintained in service and which has a substantially long operating life.

SUMMARY OF THE INVENTION

These objects are achieved by arranging the PTC elements by means of a carrier member, which serves to supply current and is rapidly connected to them and has a spring-supported plate connected to a central current contact surface, on a heating plate forming part of the intake pipe wall. The carrier member is centered in the heating plate and is loaded by a compression spring centered in the cover of the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 shows a carburetor with a heating device; and
FIG. 2 shows a top view of a carrier member.

DESCRIPTION OF THE PREFERRED EMBODIMENTS

A conventional carburetor 1 is connected to the intake pipe 2 of an internal combustion engine (not shown). Part of the intake pipe wall is formed by a heating plate 3 of a housing 4 in which the heater elements 5 with a positive temperature coefficient are arranged. Upon reaching a predetermined temperature, their resistance rises suddenly, so that hardly any energy is taken from the battery. The PTC elements 5 are rigidly connected to a carrier member 6 by soldering or adhesive. The carrier member 6 has a number of plates 7 depending on the number of elements 5. These plates are elastically connected to the central current contact surface 8 via webs 9. The carrier member 6 is pressed by means of a compression spring 10 against the PTC elements. The spring's other end is supported by cover 11 of housing 4 which has a centered hub 12 for receiving the spring 10. The cover 11, made of nonconducting material, has a hole 13 for passing a current supply cable 14 through it. This cable is soldered to the current contact surface 8 of carrier member 6. The carrier member 6 is centered in the heating plate 3 by means of a ring 15 made of non-conducting material. Shifting of elements 5 during vibrations is reliably prevented.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. In an intake pipe of a spark-ignited internal combustion engine wherein the improvement comprises an arrangement for heat including: electrical heating elements with a positive temperature coefficient; a housing having a heating plate; said positive temperature coefficient heating elements being located on said heating plate, said heating plate forming part of a wall of said intake pipe; a carrier member rigidly connected to said heating elements; said carrier member having a plurality of elastic plates, one of said plates being for each of said heating elements, said plates being connected to one central current contact surface, said carrier member being centered in said heating plate; a housing cover; and a compression spring loading said carrier member and centered in said housing cover.

* * * * *